Dec. 23, 1958 E. O. OLSEN ET AL 2,866,108
CONTROL APPARATUS
Filed Dec. 9, 1957 3 Sheets-Sheet 1
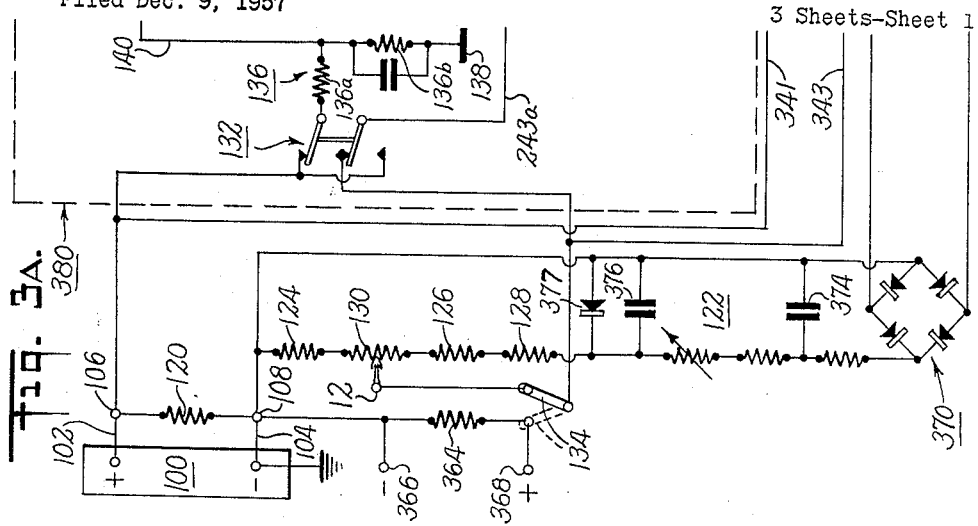
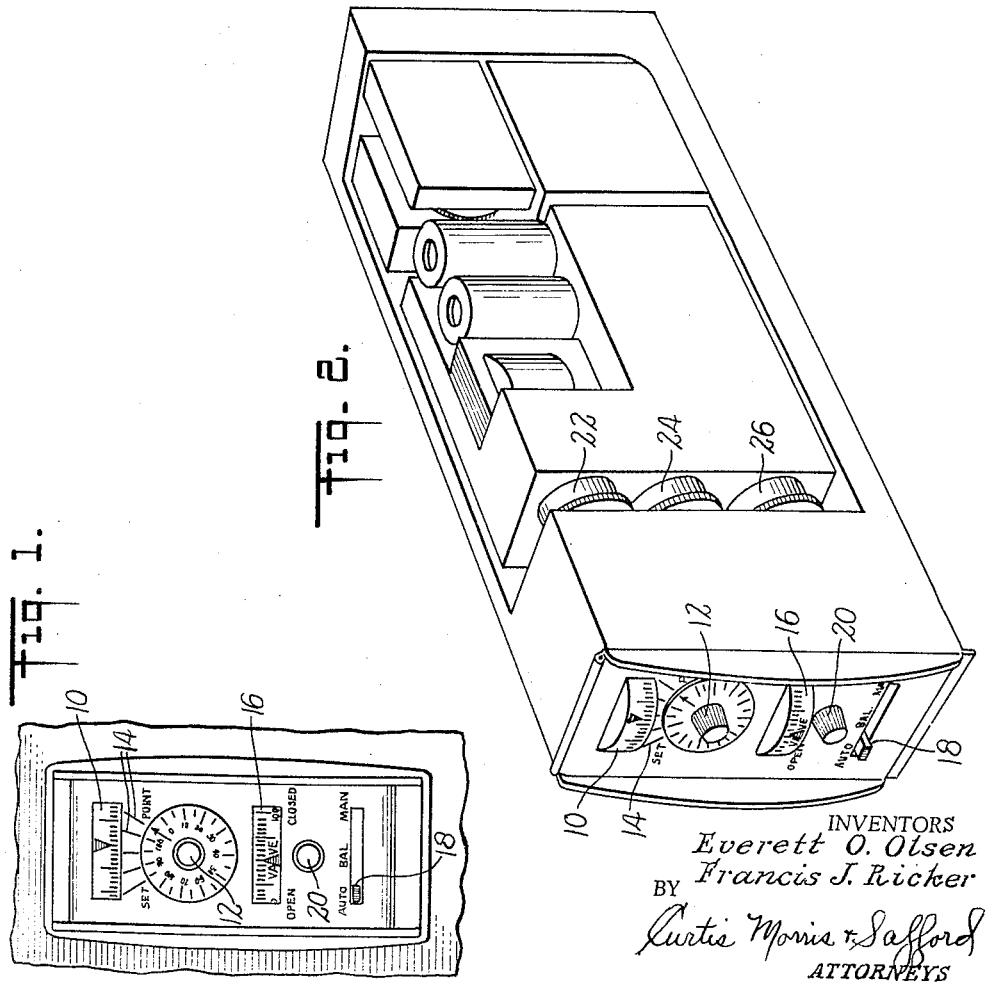
INVENTORS
Everett O. Olsen
Francis J. Ricker
BY
Curtis, Morris & Safford
ATTORNEYS Dec. 23, 1958    E. O. OLSEN ET AL    2,866,108
CONTROL APPARATUS
Filed Dec. 9, 1957    3 Sheets-Sheet 3
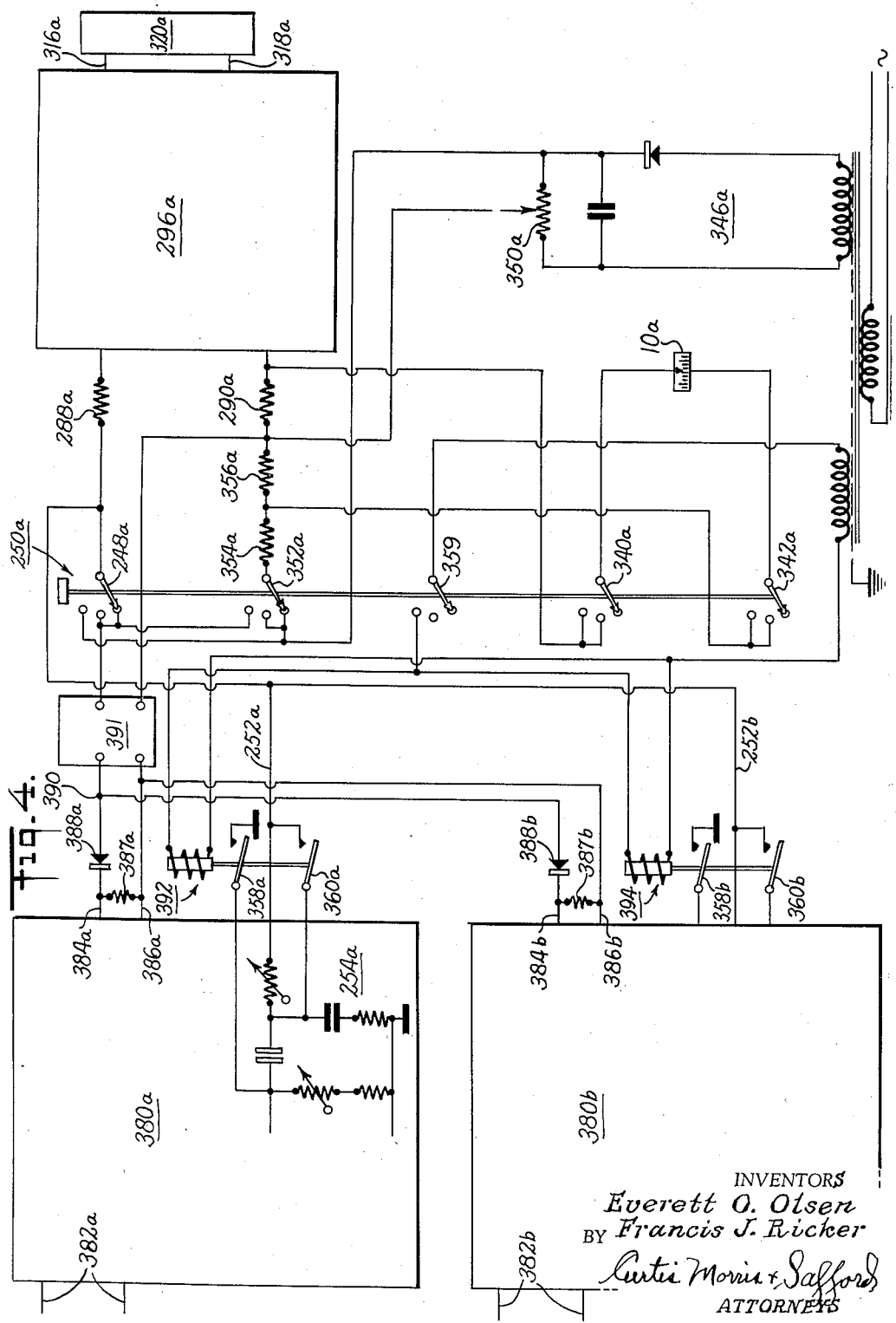
INVENTORS
Everett O. Olsen
BY Francis J. Ricker
Curtis, Morris & Safford
ATTORNEYS

United States Patent Office 2,866,108
Patented Dec. 23, 1958

2,866,108

CONTROL APPARATUS

Everett O. Olsen, Wrentham, and Francis J. Ricker, Foxboro, Mass., assignors to The Foxboro Company, Foxboro, Mass.

Application December 9, 1957, Serial No. 701,601

31 Claims. (Cl. 307—149)

This invention relates to apparatus for controlling industrial processes. More particularly, this invention relates to an electrically-operated process controller adapted to receive an electrical measurement signal and to produce a corresponding electrical control signal for transmission to a process valve which thereby functions to maintain the controlled variable at a substantially constant value.

It has been well known for many years that an all-electric process control system has certain inherent advantages over conventional control systems such as those employing pneumatic pressure signals. For example, in an all-electric system the condition measurement and control signals can readily be transmitted for long distances over standard cables, which is highly desirable in the many applications where the control apparatus is located remotely from the process. And there are other advantages, such as high speed of response, which make an electrical control system desirable.

A large number of attempts have been made to provide such electrical control apparatus, but the devices proposed have suffered from important defects which have considerably limited their utility in process control applications. A major defect of such prior devices is their complexity, which not only results in excessively high manufacturing cost but also leads to problems of equipment break-down and servicing. In addition, such prior apparatus has often been unsatisfactory due to poor stability and other operational difficulties.

As is well known, process control apparatus intended for broad applicability should provide an output signal which includes an adjustable amount of "reset" and "rate" action. Reset action is represented by a slow increase (or decrease) in the control signal which, over a long period of time, serves to maintain the process variable constant when a change in the process load tends to cause the variable to "droop" away from the control set point. Rate action is represented by a corrective signal the magnitude of which is determined by the rate-of-change of the process variable, e. g. if the process variable changes suddenly to a new level, rate action will produce an initially large control signal which subsequently diminishes in magnitude and thereby assures stable and fast response.

One of the particular disadvantages of prior electrically-operated process control apparatus resides in the means utilized to produce the desired rate and reset functions. For example, it has been proposed to develop these functions separately by independent D.-C. amplifier stages each provided with an appropriate feedback circuit, and to cascade such amplifier stages together to produce a combined output signal. Such an arrangement, however, has not been fully satisfactory, e. g. because special D.-C. power supplies must be provided to obtain proper D.-C. levels between the various stages, and because of the complexity of the resulting equipment.

Accordingly, it is an object of the present invention to provide electrically-operated process control apparatus that is superior to such apparatus provided heretofore. It is a further object of this invention to provide such apparatus that is simple in construction and reliable in operation. It is a still further object of this invention to provide an electrically-operated controller wherein the reset and rate functions are produced in a simple and effective manner. Other objects, aspects and advantages of the present invention will be pointed out in, or apparent from, the following description considered together with the accompanying drawings, in which:

Figure 1 shows the front end of a panel-mounted controller;

Fig. 2 is a perspective view of the controller with its side open;

Figure 3A:
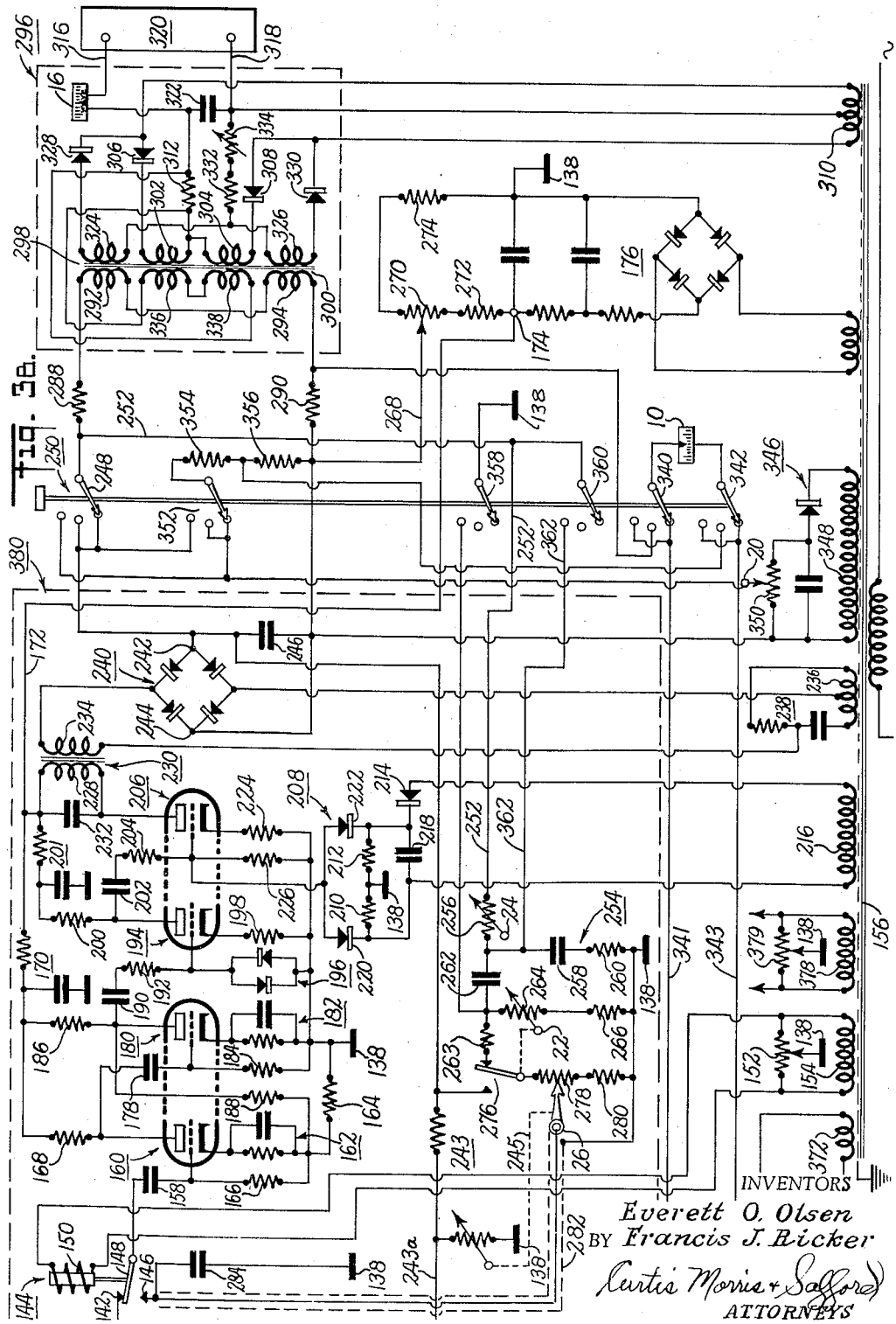

Figures 3a and 3b together are a schematic diagram of the components of the controller; and Figure 4 shows two controllers with their outputs connected together to produce a single control signal.

Referring now to Figure 1 which shows the front end of a controller mounted in a supporting panel, it will be seen that the controller includes a meter 10 serving to indicate whether and how far the controlled process variable has deviated from its set point. A manually-operable knob 12 below this meter is provided to select the set point, and guide lines 14 between the meter scale and the knob scale permit a ready determination of the value of the process variable relative to the set point. A second meter 16 serves to indicate the magnitude of the control signal being fed to the process valve.

A lever 18 extending out from the front face of the controller is laterally shiftable into any one of three positions: "automatic," "balance" and "manual." When this lever is in automatic position, the controller functions continuously to maintain the process variable at the desired set point. To shift the control system to manual operation, this lever first is moved to its balance position and (as explained in more detail hereinbelow) a knob 20 is adjusted to match the manual signal to the automatic signal being fed to the valve; subsequently, the lever 18 is moved to its manual position and the valve can then be controlled by manipulation of the knob 20.

As shown in Figure 2, the controller includes within its casing certain electrical components which serve to produce an output control signal in a manner to be described. Extending out through the side of the controller are three knobs 22, 24 and 26 which are manually operable to adjust the reset and rate action and the proportioning band.

Referring now to Figure 3a, there is shown a transmitter unit 100 which typically will be mounted adjacent a process (not shown) to produce a measurement signal in accordance with the value of a process variable, such as flow rate or temperature, to be controlled. This transmitter, which can be of any suitable design known in the art, is adapted to produce a direct-current electrical measurement signal, advantageously within the range of 10 to 50 milliamps. This signal is fed through a transmission line 102 and 104 (normally of considerable physical length) to the input terminals 106 and 108 of the process controller to be described hereinbelow in more detail.

Bridged across the controller input terminals 106 and 108 is a resistor 120, having a resistance of 100 ohms, which serves as an electrical load to produce an input voltage proportional to the transmitter output current. Connected to the lower input terminal 108, and in series-opposition to the input voltage developed across the load resistor 120, is a direct-current "set" signal produced by a D.-C. power supply generally indicated at 122, and which includes voltage-dropping resistors 124, 126, 128 and a poteniometer 130 for making manual adjustments to the controller set point. When the input voltage has a different value than the set signal appearing across the output resistor 124 and the upper portion of the potentiometer 130, there is produced a "deviation signal" which represents by its magnitude and polarity the departure of the measured process variable from its desired value. This deviation signal is fed from the upper input terminal 106 to one contact of a "direct-reverse" switch 132; and from the movable arm of the potentiometer 130, through a shiftable "remote set" link 134, to another contact of this switch. From the switch, the signal passes through a voltage-dividing and filter network 136 which includes a shunt capacitor connected to a common circuit lead 138 distinct from real "ground," i. e. this circuit lead is isolated from the instrument case.

The filtered deviation signal is conducted along a lead 140 to (see Figure 3b) one fixed contact 142 of a 60-cycle (power line frequency) vibrator 144. The other fixed contact 146 is supplied with a D.-C. feedback signal which is developed in a manner to be explained hereinbelow in more detail.

The movable contact 148 of the vibrator 144 is actuated by a coil 150 which is energized, in parallel with a hum-cancelling potentiometer 152, by a winding 154 of a 60-cycle power transformer 156. The movable contact alternately engages the two fixed contacts 142 and 146 and thereby produces a 60-cycle square-wave signal representing the difference between the D.-C. deviation signal and the D.-C. feedback signal. This square-wave signal is fed through a coupling capacitor 158 to the control grid of the first stage 160 of a four-stage A.-C. amplifier consisting of two dual-triodes. This amplifier provides fast and effectively linear amplification of the square-wave signal, within the normal limits of signal amplitude, and produces an intensified A.-C. output signal as will be described.

The cathode of the first amplifier stage 160 is connected through an R-C biasing network 162 and a resistor 164 to the common circuit lead 138. The resistor 164 provides negative feedback action which increases the input impedance of the amplifier (to about 50 megohms) and thereby minimizes reduction of the amplifier input signal when the vibrator is connected to the feedback circuit to be described. A grid-return resistor 166 is connected between the control grid and the left-hand end of the resistor 164.

The plate of the first amplifier stage 160 is connected through a load resistor 168, an R-C decoupling network 170, and a power lead 172 to the positive terminal 174 of a D.-C. power supply generally indicated at 176. The amplified square-wave signal on the plate is fed through a coupling capacitor 178 to the control grid of the second amplifier stage 180 which includes an R-C biasing network 182 connected between the cathode and the common lead 138, and a grid-return resistor 184 also is connected to this lead. The plate of this stage is connected through a load resistor 186 to the D.-C. power supply 176, and through a resistor 188 to the cathode resistor 164 of the first stage 160 to provide a large amount of negative feedback action.

The square-wave output signal from the second amplifier stage 180 is fed through a coupling capacitor 190 and a resistor 192 to the control grid of the third stage 194. The lower terminal of this resistor also is connected through a pair of reverse-connected diodes 196 to the common lead 138. These diodes limit the magnitude of the signal fed to the control grid, e. g. to within about 0.1 volt with respect to the common lead 138. Such limiting is advantageous in that it effectively prevents damped oscillations and similar instability that might occur when a relatively large signal is suddenly applied to the input of the controller.

The cathode of the third stage 194 is connected through a resistor 198 directly to the common lead 138 to provide a degenerative feedback for improving stability. The plate of this stage is connected through a load resistor 200 and an R-C decoupling network 201 to the D.-C. power lead 172, and the amplified signal on the plate is fed through a coupling capacitor 202 and a limiting resistor 204 to the control grid of the fourth amplifier stage 206. This amplified signal also is fed to a "clipper circuit," generally indicated at 208, which serves to prevent the signal feed to the fourth amplifier stage from deviating more than plus or minus 3 volts from the potential of the common lead 138.

For this purpose, the clipper circuit 208 includes a pair of series-connected balanced resistors 210 and 212 the adjacent terminals of which are connected to the common lead 138. The remote terminals of these resistors are supplied with 6 volts D.-C. through a rectifier 214 connected to a secondary winding 216 of the power transformer 156. A filter capacitor 218 is connected in parallel with the two resistors to smooth out any ripple components.

The remote terminals of the resistors 210 and 212 also are connected respectively through a pair of reverse-connected diodes 220 and 222 to the lower terminal of the resistor 204. When the signal on this lower terminal is within plus or minus 3 volts of the potential of the common lead 138, there will be no conduction through either of the diodes, and consequently the signal will be unaffected by the clipper circuit 208. When the signal exceeds 3 volts, however, one or the other of the diodes (depending upon the polarity of the signal) will conduct and thereby lower the resistance in series with the resistor 204; the resulting increased current flow through resistor 204 effectively prevents the control grid signal from deviating beyond the voltage at which conduction through the diode commenced.

The cathode of the fourth stage 206 is connected through a resistor 224 to the common lead 138, to provide degenerative feedback, and a grid-return resistor 226 also is connected to this lead in the usual way. The plate is connected through the primary winding 228 of a transformer 230 to the D.-C. power lead 172, and a capacitor 232 is connected in parallel with this winding to form a tuned circuit resonant at or near the operating frequency of the vibrator 144 to produce a substantially undistorted sine wave in the transformer secondary winding 234 and to adjust the phase of this signal most advantageously with respect to the comparison voltage referred to below.

The signal developed in the secondary winding 234 of the transformer 230 is connected in series with a fixed amplitude, A.-C. comparison voltage obtained from a winding 236 on to the power transformer 156. This winding includes a phase-shifting network 238 to produce phase alignment between the comparison voltage and the amplified signal in the secondary winding 234. The resulting combined signal is fed to a bridge rectifier network generally indicated at 240. This bridge rectifier network produces a D.-C. output signal across its terminals 242 and 244 the magnitude of which is determined by the amplitude of the signal formed by the combination of the amplified signal developed in the secondary winding 234 and the A.-C. comparison voltage. Thus the bridge rectifier serves as a phase-sensed amplitude detector. A filter capacitor 246 is connected in shunt across the detector output terminals to smooth out any ripple components present in the output.

The direct-current output signal from the right-hand phase-sensed detector terminal 242 is fed to one section 248 of an "automatic-balance-manual" switch 250 which, when in "automatic" position (as shown), connects this output signal through a feedback lead 252 to an R-C network generally indicated at 254. This network includes an adjustable series resistor 256 connected to one plate of a shunt capacitor 258 the other plate of which is connected through a small resistor 260 to the common lead 138. This resistance and capacitance combination forms a "rate" generating circuit. The network 254 also includes a series capacitor 262 with a shunt potentiometer 264 the lower terminal of which is connected through a small resistor 266 to the common lead 138; these latter elements together form a "reset" generating circuit.

Reverting now to the phase-sensed detector 240, the left-hand output terminal 244 of this detector is connected through a lead 268 to the movable arm of a potentiometer 270 which is connected, in series with two voltage-dropping resistors 272 and 274, between the D.-C. power lead 174 and the common lead 138. This arrangement provides a D.-C. bias voltage equal in magnitude but opposite in polarity to the normal D.-C. output of the phase-sensed detector when there is no A.-C. signal fed thereto from the transformer 230. Consequently, with zero A.-C. signal, there will be no D.-C. feedback signal fed along the lead 252 to the R-C rate and reset network 254. When there is an A.-C. signal, a corresponding D.-C. feedback signal will be developed having a magnitude proportional to the amplitude of the A.-C. signal, and a polarity determined by the phase of this A.-C. signal relative to the comparison voltage fed from the power transformer winding 236.

The left-hand plate of the reset capacitor 262 is connected through a resistor 263 and a switch 276 to the upper end of a potentiometer 278, the lower end of which is returned through a small resistor 280 to the common lead 138. This potentiometer controls the magnitude of the D.-C. feedback signal which is fed from the movable arm through a shielded cable 282 to the lower fixed contact 146 of the vibrator 144. The cable shield is connected to the common lead 138 to minimize A.-C. pickup, and a capacitor 284 is connected to the fixed contact 146 for the same purpose. The resistor 263 serves to prevent the capacitor 262 from being directly connected to the amplifier input, so as to avoid instability effects.

Positive feedback for the four stage amplifier is provided by a connection from the phase-sensed detector terminal 242, through a voltage-dividing network 243 and a lead 243a back to the lower deviation signal lead (Figure 3a). The lower resistor of this network is variable, and is ganged by a link 245 to the movable arm of the proportioning-band potentiometer in such a way as to change the amount of positive feedback as the proportioning band is widened.

Referring now to the overall operation of this portion of the controller, when the measured process condition changes from its set point value to a new level, a D.-C. deviation signal is fed to the vibrator fixed contact 142, and a corresponding square-wave A.-C. signal is coupled to the amplifier input. This square-wave signal is amplified, converted to a corresponding sine-wave signal by the tuned circuit 228, 232 in the amplifier output, and fed to the phase-sensed detector 240. The resultant D.-C. signal produced by the detector is fed back through the network 243 to increase the effective gain of the amplifier, and also is fed back through the R—C network 254 and thereby changes the potential of the fixed contact 146 so as to tend to reduce the amplitude of the square-wave signal fed to the amplifier input.

The magnitude of the feedback signal reaching the fixed contact 146 varies with time after application of a constant deviation signal to the other fixed contact 142, due to the reactance in the network 254. This variation of course alters the magnitude of the direct-current output signal produced by the phase-sensed detector 240, and the alteration of this output signal includes both rate and reset action in accordance with the setting of the rate and reset resistors 256 and 264.

Rate action is produced by the charging of the rate capacitor 258. When a changed level of D.-C. signal is applied to the network 254, the voltage across the rate capacitor can not immediately change correspondingly, due to the capacitive energy storage effect, and the initial feedback signal produced by the rate circuit accordingly consists only of the small voltage drop across the resistor 260 resulting from the rate capacitor charging current. This initial feedback signal is coupled through the reset capacitor 262 and the proportioning-band potentiometer 278 to the fixed contact 146. Since this initial feedback signal is quite small, the corresponding A.-C. signal fed to the amplifier input will be relatively large, and the change in the direct-current output signal produced by the phase-sensed detector 240 also will be relatively large. The resistor 260, by permitting a small initial feedback signal to be produced, improves the internal stability of the controller and also assures that the initial controller output signal is not so large as to produce excessive valve action.

As the rate capacitor 258 charges up, the feed-back signal will continually increase in magnitude, and the direct-current output signal will correspondingly decrease in magnitude. Thus, the controller will, in response to a constant-magnitude deviation signal, produce a control signal that is initially large (to develop an immediate and substantial corrective action at the process for returning the measured condition to its desired set point) but that drops off in magnitude with the passage of time so as to avoid instability effects such as continuous cycling or oscillation. The resistor 256 controls the rate at which the capacitor 258 charges, and hence determines the amount of rate action present in the direct-current output signal.

"Reset" action is provided by the capacitor 262 which charges up slowly through the resistance of the potentiometer 264. Over a relatively long period of time following the application of a constant-magnitude deviation signal to the upper fixed contact 142 of the vibrator 144, the charging of the capacitor 262 gradually reduces the D.-C. feedback signal fed to the lower fixed contact 146 and thereby increases the magnitude of the direct-current output signal produced by the phase-sensitive rectifier circuit 240. Consequently, the controller is enabled to produce a gradually increasing control signal that offsets the effects of a steady-state load change on the process. The positive feedback through network 243 improves this characteristic by increasing the "static" gain of the amplifier by a factor of about 3.

The capacitor 262 and potentiometer 264 are arranged to provide a maximum charging "time-constant" of 30 minutes, i. e. if the reset feedback circuit is disconnected from the amplifier, the reset capacitor will be charged to about two-thirds of its final value within 30 minutes after the application of a constant-magnitude direct-current signal to the right-hand capacitor plate. This time-constant can be altered by adjusting the potentiometer 264, to accommodate various process characteristics. In addition, the potentiometer control knob 22 is arranged to operate the switch 276 when the potentiometer has been set for minimum time-constant (about one second). Operation of this switch disconnects the R-C network 254 from the feedback circuit, and connects the phase-sensed detector output terminal 242 directly to the proportioning-band potentiometer 278, so that the controller can readily be set to operate without rate and reset action if required for a particular process application.

It may particularly be noted that the R-C rate and reset network 254 is connected in a circuit wherein the voltage levels are relatively low (only several volts or so). As a result, the reset capacitor may have a relatively large capacitance without being excessively large in physical size and without introducing important errors due to conductive leakage through the capacitor. Moreover, a correspondingly smaller reset resistance may be used thereby avoiding the need for extremely high-impedance circuitry with accompanying leakage problems, and the resistor furthermore may be of the continuously-variable potentiometer type.

In an embodiment of the present invention, the reset capacitor 262 was 20 microfarads and the maximum reset resistance 264 was 90 megohms, to obtain the desired 30 minute time-constant. The rate resistor was 15 megohms, and the rate capacitor was 150 microfarads. Resistor 263 was 16 megohms and the maximum resistance of the proportioning band potentiometer 278 was 90 megohms. Resistors 260, 266 and 280 were 22,000 39,000 and 50,000 ohms respectively. Resistors 136a and 136b of the network 136 were 110,000 and 680,000 ohms respectively, to compensate for the voltage-dividing action of resistor 263 and potentiometer 278.

Returning again to the phase-sensed detector 240, the direct-current output signal from the terminals 242 and 244 is fed through the switch section 248 (when in "automatic" position as shown) and through a pair of resistors 288 and 290 to the input windings 292 and 294 of a full-wave magnetic amplifier generally indicated at 296. This amplifier includes a pair of saturable magnetic cores 298 and 300 each having a gate winding 302 and 304. These gate windings are energized through respective rectifiers 306 and 308 by 60-cycle energizing signals obtained from opposite ends of a center-tapped winding 310 on the power transformer 156. The gate windings are connected together at their adjacent terminals, and the magnetic amplifier D.-C. output current passes from this common connection through a feedback resistor 312, the meter 16, and a signal transmission lead 316 to one terminal of an electrical valve-operating device generally indicated at 318. The valve (not shown) is arranged to alter a characteristic of the process so as to influence the variable being measured by the transmitter 100 and tend to return this variable to its set point value. The direct-current output signal is returned from the other terminal of the device 318 through a lead 320 to the center-tap of the power transformer winding 310, and a filter capacitor 322 is connected in shunt across the output of the magnetic amplifier to smooth out any ripple components.

The magnetic amplifier 296 also includes a pair of bias windings 324 and 326 wound respectively on the cores 298 and 300. These latter windings are energized from the power winding 310 through a second pair of rectifiers 328 and 330 which are poled oppositely to the first pair of rectifiers 306 and 308, and the common connection of the bias windings is returned through a pair of resistors 332 and 334 back to the center-tap of the power winding 310. With this arrangement, during the half-cycle that the left-hand side of the power winding 310 is supplying current to the lower gate winding 304, the right-hand side of the power winding is supplying current to the upper bias winding 324, and vice versa. Consequently, the signal fed to the bias windings is relatively free of fluctuations resulting from the sharp saturation effects encountered while current is flowing through the gate windings.

The magnetic amplifier 296 also includes a pair of negative feedback windings 336 and 338 which are connected in series across the feedback resistance 312. In an embodiment of the present invention, the magnetic amplifier was arranged to provide an output signal within the range of 10 to 50 milliamps.

With the "automatic-balance-manual" switch 250 in its "automatic" position (as shown), the two lower sections 340 and 342 of this switch serve to connect the meter 10 through a pair of leads 341 and 343 and (see Figure 3a) across the input circuit of the controller so as to read the magnitude of the deviation signal. When it is desired to operate the control system manually, the switch 250 first is shifted to its "balance" (central) position to connect the meter 10 in the input circuit of the magnetic amplifier 296 so as to indicate the difference between (1) the signal being fed to the magnetic amplifier by the phase-sensed detector circuit 240 and (2) the signal produced by an adjustable D.-C. power source generally indicated at 346. This source consists of a conventional rectifier power supply energized by a winding 348 on the power transformer 156, and includes an output potentiometer 350 to provide an adjustable D.-C. signal which (when the switch 250 is in either "automatic" or "balance" position) is fed through the switch section 352 to two series-connected resistors 354 and 356. The meter 10, when the switch 250 is in "balance" condition, is connected across the series combination of the lower one of these resistors 356 and the resistor 290 in the magnetic amplifier input circuit, and thereby provides an indication of the difference between the setting of the manual power supply 346 and the "automatic" signal being fed to the magnetic amplifier.

To prepare the controller for switch-over to manual operation, the manual supply potentiometer 350 is adjusted, by means of the knob 20, until the meter 10 reads zero. Then when the switch 250 is shifted from "balance" to its "manual" position (i. e. the extreme upper position in Figure 3), the manual power supply 346 will feed a current through the top section 248 of the switch 250 (and thence through the input windings 292 and 294 of the magnetic amplifier 296) that is equal to the current previously fed thereto when the controller was conditioned for automatic operation. Once the process controller is on manual operation, the knob 20 may be manipulated so as to position the process valve at any desired setting.

When the switch 250 has been shifted to its "manual" position, the remaining two sections 358 and 360 of this switch operate to short out the rate and reset resistors 256, 264 and 266. As a result, the right-hand plate of the reset capacitor 262 is connected through a lead 362 directly to the movable arm of the potentiometer 350, and the left-hand plate is connected to the common circuit lead 138. With this arrangement, the charge on the reset capacitor will be determined by the manual signal fed to the magnetic amplifier 296 so that, whenever the controller is shifted back to "automatic," the switchover will take place smoothly.

The controller also is provided with means for varying the set point remotely. For this purpose, referring now to Figure 3a, the link 134 is shifted to its alternate position (shown in dotted outline) which connects a 100 ohm resistor 364 between the lower input terminal 108 and the switch 132. The ends of the resistor 364 are connected respectively to a pair of set point input terminals 366 and 368 to which may be fed from a remote control point a set current variable within the range of 10 to 50 milliamps. The resulting voltage developed across the resistor 364 is connected in series opposition to the voltage developed across the input resistor 120, and thus produces a D.-C. deviation signal which is fed to the vibrator 144 as before.

The power supply 122 includes a bridge rectifier 370 which is energized by a winding 372 on the power transformer 156. The output of the bridge rectifier is filtered by a R-C circuit including a pair of capacitors 374 and 376, and a reverse-connected voltage regulating diode 377 is shunted across the second of these capacitors in order to regulate the D.-C. output voltage of the power supply. Further details on the operation of such a diode regulator circuit are disclosed in the copending application of Horace E. Darling, Serial No. 540,783, filed October 17, 1955. The transformer 156 also is provided with a winding 378 for supplying current to the filaments of the amplifier stages 160 and 180, and this winding is shunted by a hum-balancing potentiometer 379. Winding 216 supplies filament current to the other two amplifier stages 194 and 206.

Referring now to Figure 4, there is shown an arrangement for controlling a process in accordance with the changes in one or the other of two different process variables. In this arrangement, the process valve is operated by either one of two controllers depending upon which controller produces the larger control signal.

For this purpose, there is provided two "control function generators" indicated in block form at 380a and 380b, and each of which includes the amplifier and feedback circuitry shown in Figures 3a and 3b within the dashed line block 380. (Note: to simplify the description of this aspect of the invention, no D.-C. power supply corresponding to the source 176 of Figure 3b has been shown in Figure 4, and certain A.-C. power connections also have been omitted.) Each of these control function generators has an input circuit 382a and 382b adapted to receive a D.-C. deviation signal developed in conjunction with a D.-C. set point signal as explained above in connection with Figure 3a. This deviation signal is, as before, converted to an A.-C. signal, amplified, and reconverted to a D.-C. output signal which is fed out from each function generator along leads 384a, b and 386a, b. Although the details of the control function generators are not shown in Figure 4, it will be apparent that the leads 384a, b will be connected within each generator to one phase-sensed detector output terminal (i. e. reference 242 in Figure 3b) while the leads 386a, b will be connected to the other detector output terminal (reference 244). The output leads are shunted by load resistors 387a, b.

Leads 384a, b are connected through corresponding rectifiers 388a, b to a common point 390 and, through an impedance matching device generally indicated in block form at 391, to the two lower contacts of one section 248a of an "automatic-balance-manual" switch generally indicated at 250a. The movable arm of this switch section is connected through leads 252a and 252b to the R-C feedback circuitry within the function generators 380a, b. (Only one feedback network 254a is shown, in a fragmentary schematic, it being understood that the corresponding network in the other control function generator is identical.)

This feedback circuitry operates as explained in connection with Figure 3b to produce rate and reset action in the D.-C. output signals produced on the leads 384a, b and 386a, b. When the switch 250a is in "automatic" position (as shown), the D.-C. control signal is fed from the common point 390 through the device 391, through the switch section 248a, and through a pair of resistors 288a and 290a and the input circuit of a magnetic amplifier indicated in block form at 296a (identical to the magnetic amplifier 296 shown in Figure 3b). The D.-C. output signal produced by this magnetic amplifier is conducted along a transmission line 316a, 320a to a valve operating device generally indicated at 318a.

When the output signal produced by the upper control function generator 380a is larger than that produced by the lower function generator 380b, current will flow from the upper generator lead 386a into the input circuit of the magnetic amplifier 296a and through the rectifier 388a back to lead 384a. However, since in this condition the potential of the common point 390 is larger (negatively) than the potential on the lower generator line 384b, there will be no conduction through the lower rectifier 388b. As a result, the output signal developed by the lower generator 380b is not effective in influencing the input signal fed to the magnetic amplifier 296a. On the other hand, when the output signal produced by the lower generator 380b is larger than that produced by the upper generator 380a, the magnetic amplifier will be controlled by the lower generator and the upper generator will not be effective in influencing the output signal. The load resistors 387a, b serve to assure that the output voltages of the control function generators are not importantly altered by the selection action.

The signal selection effect is achieved with particular sharpness when the internal impedance of the control function generators is substantially less than the impedance of the load circuit connected to the common point 390. Since the magnetic amplifier 296a has a relatively low input impedance, it is advantageous to employ the impedance-matching device 391 to present a relatively high impedance to the control-function generators, especially when these generators are provided with a positive feedback connection as described above. The impedance-matching device may, for example, consist of a vacuum tube connected as a cathode follower, with the control grid connected to the common point 390 and the cathode connected to the magnetic amplifier input circuit.

It may particularly be noted that the feedback connection along leads 252a, b is operative for both control function generators 380a, b at all times. For example, if the output of the lower generator 380b is blocked off by the rectifier 388b, the D.-C. output signal from the upper generator will nevertheless continue to be fed back to the R-C network in the lower generator so as to maintain the reset capacitor in that network charged to the level of the signal then being fed to the magnetic amplifier 296a. Consequently, whenever the output signal developed by the generator 380b becomes sufficiently large to take control of the system, there will be no sudden change in the controlled process variable due to the recharging of this reset capacitor.

When it is desired to switch the system to manual operation, the switch 250a first is actuated to its "balance" (central) position. Sections 340a and 342a of this switch thereupon are operated to connect a meter 10a across the resistor 290a and a second resistor 356a. Current is fed to this second resistor by a manual D.-C. power supply 346a having an adjustable potentiometer 350a which produces an output signal that is coupled through switch section 352a and a resistor 354a to the resistor 356a. The meter 10a indicates the difference in current flowing through the two resistors 356a and 290a, and the potentiometer 350a is adjusted until this difference is zero. When this condition has been obtained, the switch 250a is shifted to its "manual" (uppermost) position wherein the output of the manual power supply 346a is fed directly to the magnetic amplifier 296a to control the valve-operating device 318a.

When the switch 250a has been placed in its "manual" position, another section 359 of this switch is operated to supply current to a pair of relays 392 and 394. These relays operate to close a pair of contacts 358a, b and 360a, b which, as in the arrangement described with reference to Figure 3b, short out the rate and reset resistors in the respective R-C feedback networks. Consequently, the charge on the reset capacitors of both control function generators is maintained at a level corresponding to the manual signal being fed to the magnetic amplifier 296a.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. An industrial process control system comprising, in combination, a condition-responsive device located at the process and arranged to produce a direct-current measurement signal in accordance with a selected condition of said process, an adjustable set signal power supply arranged to produce a direct-current set signal of predetermined magnitude, circuit means for connecting the outputs of said condition-responsive device and said power supply in series-opposition so as to produce a direct-current deviation signal representing the extent to which said process condition deviates from a preselected value, control signal generating apparatus including a signal comparison circuit having first and second inputs, said comparison circuit comprising converter means arranged to develop an alternating-current signal responsive to the difference between a pair of direct-current signals fed to said inputs respectively, means for feeding said direct-current deviation signal to said first comparison circuit input, an A.-C. amplifier coupled to the output of said comparison circuit to intensify the alternating-current signal produced thereby, amplitude detection means connected to the output of said amplifier to transform said intensified alternating-current signal to a corresponding direct-current output signal, a feedback circuit coupled between the output of said detection means and said second input of said comparison circuit, first and second reactance means in said feedback circuit to produce at said second comparison circuit input a feedback signal which varies with respect to time if a constant direct-current signal is applied to said feedback circuit, said first reactance means tending to increase the magnitude of the feedback signal with the passage of time and said second reactance means tending to decrease the magnitude of said feedback signal with the passage of time, whereby said direct-current output signal is caused to vary so as to produce both rate and reset action, adjustment means for altering the effectiveness of said reactance means in varying said direct-current output signal, electrically-controllable operating means associated with said process for changing a characteristic of said process so as to influence said measured condition, and transmission circuit means for feeding to said operating means a control signal corresponding to said direct-current output signal to change said characteristic when necessary to maintain said condition substantially constant.

2. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to a device operable to vary a characteristic of said process so as to maintain said process condition substantially constant, said apparatus comprising, in combination, a signal comparson circuit having first and second inputs and including converter means arranged to develop an alternating-current signal responsive to the difference between a pair of direct-current signals fed to said inputs respectively, means for feeding said direct-current deviation signal to said first input, an A.-C. amplifier coupled to the output of said comparison circuit to intensify the alternating-current signal produced thereby, amplitude detection means connected to the output of said amplifier to transform said intensified alternating-current signal to a corresponding direct-current output signal, a feedback circuit coupled between the output of said detection means and said second input of said comparison circuit, first and second reactance means in said feedback circuit to produce at said second input a feedback signal which varies with respect to time if a constant direct-current signal is applied to said feedback circuit, said first reactance means tending to increase the magnitude of the feedback signal with the passage of time and said second reactance means tending to decrease the magnitude of said feedback signal with the passage of time, whereby said direct-current output signal is caused to vary so as to produce both rate and reset action, adjustment means for altering the effectiveness of said reactance means in varying said direct-current output signal, and output circuit means for transmitting a control signal corresponding to said output signal to a device operable to change said process characteristic.

3. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to a device operable to vary a characteristic of said process so as to maintain said process condition substantially constant, said apparatus comprising, in combination, a cyclically-operable signal comparison means having first and second fixed contacts and a movable contact operable alternately to engage said fixed contacts so as to produce an alternating-current signal in accordance with the difference in magnitude between the signals fed to said fixed contacts respectively, means for feeding said direct-current deviation signal to said first fixed contact, an A.-C. amplifier coupled to said movable contact to intensify the alternating-current signal produced by said comparison means, amplitude detection means connected to the output of said amplifier to transform said intensified alternating-current signal to a corresponding direct-current output signal, a direct-current feedback circuit connected between the output of said detection means and said second fixed contact, electrical reactance means in said feed-back circuit to produce at said second fixed contact a feed-back signal which varies with respect to time if a constant direct-current signal is applied to said feed-back circuit, whereby said direct-current output signal is caused to change in a predetermined manner, manually-operable adjustment means for altering the effectiveness of said reactance means in varying said direct-current output signal, and output circuit means for transmitting a control signal corresponding to said direct-current output signal to a device operable to change said process characteristic.

4. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to means operable to vary a characteristic of said process so as to maintain said process condition substantially constant, said apparatus comprising, in combination, a signal comparison circuit having first and second inputs and including converter means arranged to develop an alternating-current signal responsive to the difference between a pair of direct-current signals fed to said inputs respectively, means for feeding said direct-current deviation signal to said first input, an A.-C. amplifier coupled to the output of said comparison circuit to intensify the alternating-current signal produced thereby, amplitude detection means connected to the output of said amplifier to transform said intensified alternating-current signal to a corresponding direct-current output signal, a direct-current feedback circuit coupled between the output of said detection means and said second input of said comparison circuit, rate and reset means in said feedback circuit for producing at said second input a feedback signal which varies with respect to time if a constant direct-current signal is applied to said feedback circuit, said rate means comprising a series resistor and a shunt capacitor, said reset means comprising a series capacitor and a shunt resistor, whereby said direct-current output signal is caused to vary so as to produce both rate and reset action, manually-operable adjustment means for changing the resistance of said resistors so as to alter the effectiveness of said rate and reset means in varying said direct-current output signal, and output circuit means for transmitting said direct-current output signal to operating means arranged to change said process characteristic so as to maintain said condition substantially constant.

5. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding direct-current output signal for transmission to a device operable to vary a characteristic of said process so as to maintain said process condition substantially constant, said apparatus comprising, in combination, cyclically-operable signal comparison means having first and second inputs and including circuit interrupting means operable to produce an alternating-current signal in accordance with the difference in magnitude between the signals fed to said first and second inputs respectively, means for feeding said direct-current deviation signal to said first input, an A.-C. amplifier coupled to the output of said comparison means to intensify the alternating-current signal produced thereby, a phase-sensed amplitude detector connected to the output of said amplifier to transform said intensified alternating-current signal to a corresponding direct-current output signal, a direct-current feedback circuit connected between the output of said phase-sensed detector and said second comparison means input, electrical reactance means in said feedback circuit to produce at said second input a feedback signal which varies with respect to time, whereby said direct-current output signal is caused to change in a predetermined manner upon the application of a constant-magnitude direct-current deviation signal to the first input of said comparison means, manually-operable adjustment means for altering the effectiveness of said reactance means in varying said direct-current output signal, and output circuit means for transmitting said direct-current output signal to a process controlling device.

6. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding direct-current output signal for transmission to a device operable to vary a characteristic of said process so as to maintain said process condition substantially constant, said apparatus comprising, in combination, cyclically-operable signal comparison means having first and second inputs and arranged to produce an alternating-current signal having an amplitude proportional to the difference in magnitude between a pair of D.-C. signals fed to said inputs respectively, means for feeding said direct-current deviation signal to said first input, an A.-C. amplifier coupled to the output of said comparison means to intensify the alternating-current signal produced thereby, a phase-sensed amplitude detector connected to the output of said amplifier to convert said intensified alternating-current signal to a corresponding direct-current output signal, a direct-current feedback circuit composed entirely of passive elements and connected between the output of said phase-sensed detector and said second comparison means input, said feedback circuit including rate and reset means to produce at said second input a feedback signal which varies with respect to time upon the application of a constant-magnitude direct-current deviation signal to said first input, whereby said direct-current output signal is caused to change in a predetermined manner, manually-operable adjustment for altering the effectiveness of said rate and reset means in varying said direct-current output signal, and output circuit means for transmitting said direct-current output signal to a process controlling device.

7. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding direct-current output signal for transmission to a device operable to vary a characteristic of said process so as to maintain said process condition substantially constant, said apparatus comprising, in combination, cyclically-operable signal comparison means having first and second fixed contacts and a movable contact operable alternately to engage said fixed contacts so as to produce an alternating-current signal in accordance with the difference between the signals fed to said contacts respectively, means for feeding said direct-current deviation signal to said first fixed contact, an A.-C. amplifier coupled to said movable contact to intensify the alternating-current signal produced thereby, a phase-sensed amplitude detector connected to the output of said amplifier to transform said intensified alternating-current signal to a corresponding direct-current output signal, a direct-current feedback circuit composed entirely of passive elements and connected between the output of said phase-sensed detector and said second fixed contact, series-connected rate and reset circuit means in said feedback circuit to produce at said second fixed contact a feedback signal which varies with respect to time upon the application of a constant direct-current signal to said first fixed contact, whereby said direct-current output signal is caused to change in a predetermined manner, said rate means comprising a series resistor and a shunt capacitor, said reset means comprising a series capacitor and a shunt resistor, manually-operable adjustment means for altering the ohmic resistance of said resistors to change the effectiveness of said rate and reset circuit means in varying said direct-current output signal, and output circuit means for transmitting said direct-current output signal to a process controlling device.

8. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to a device operable to vary a characteristic of said process so as to maintain said process condition substantially constant, said apparatus comprising, in combination, a signal comparison circuit having first and second inputs and including converter means arranged to develop an alternating-current signal responsive to the polarity and magnitude of the difference between a pair of direct-current signals fed to said inputs respectively, means for feeding said direct-current deviation signal to said first input, an A.-C. amplifier coupled to the output of said comparison circuit to intensify the alternating-current signal produced thereby, amplitude detection means connected to the output of said amplifier to transform said intensified alternating-current signal to a corresponding direct-current output signal, a direct-current feedback circuit composed entirely of passive elements and coupled between the output of said detection means and said second input of said comparison circuit, rate and reset means in said feedback circuit for producing at said second input a feedback signal which varies with respect to time if a constant direct-current signal is applied to said first comparison circuit input, said rate means comprising a series resistor and a shunt capacitor, said reset means comprising a series capacitor and a shunt resistor, whereby said direct-current output signal is caused to vary so as to produce both rate and reset action, manually-operable adjustment means for changing the resistance of said resistors so as to alter the effectiveness of said rate and reset means in varying said direct-current output signal, adjustable attenuation means in said feedback circuit for changing the proportioning band setting of said apparatus, and output circuit means for transmitting a control signal corresponding to said direct-current output signal to a process controlling device.

9. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to a device operable to vary a characteristic of said process so as to maintain said process condition substantially constant, said apparatus comprising, in combination, a signal comparison circuit having first and second inputs and including converter means arranged to develop an alternating-current signal responsive to the difference between a pair of direct-current signals fed to said inputs respectively, means for feeding said direct-current deviation signal to said first input, an A.-C. amplifier coupled to the output of said comparison circuit to intensify the alternating-current signal produced thereby, amplitude detection means connected to the output of said amplifier to transform said intensified alternating-current signal to a corresponding direct-current output signal, a direct-current negative feedback circuit connected between the output of said detection means and said second input of said comparison circuit, reactance means in said feedback circuit for producing at said second input a feedback signal which varies with respect to time if a constant direct-current signal is applied to said first input, whereby said direct-current output signal is caused to vary accordingly, a direct-current positive feedback circuit connected between the output of said detection means and said first input, and output circuit means for transmitting said direct-current output signal to a process controlling device.

10. Apparatus as claimed in claim 9, wherein said positive feedback circuit includes a pair of resistors arranged as a voltage-dividing network.

11. Apparatus as claimed in claim 9, including adjustable attenuation means in said negative feedback circuit for changing the proportioning band of said apparatus, variable means in said positive feedback circuit for altering the magnitude of the positive feedback signal fed to said first input, and means interconnecting said adjustable attenuation means and said variable means such that the amount of said positive feedback signal is adjusted as the proportioning band is widened.

12. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding direct-current output signal for transmission to a device operable to vary a characteristic of said process so as to maintain said process condition substantially constant, said apparatus comprising, in combination, a signal comparison circuit having first and second inputs and including converter means arranged to develop an alternating-current signal having a phase and amplitude responsive to the polarity and magnitude of the difference between a pair of direct-current signals fed to said inputs respectively, means for feeding said direct-current deviation signal to said first input, an A.-C. amplifier coupled to the output of said comparison circuit to intensify the alternating-current signal produced thereby, a phase-sensed amplitude detector connected to the output of said amplifier to transform said intensified alternating-current signal to a corresponding direct-current output signal, a direct-current feedback circuit connected between the output of said phase-sensed detector and said second input of said comparison circuit, reactance means in said feedback circuit for producing at said second input a feedback signal which varies with respect to time upon the application of a constant direct-current signal to said first input, whereby said direct-current output signal is caused to vary in response to a constant deviation signal, manually-operable adjustment means for altering the effectiveness of said reactance means in varying said direct-current output signal, a magnetic amplifier coupled to the output of said phase-sensed detector to intensify said direct-current output signal, and output circuit means for transmitting said intensified direct-current output signal to a process controlling device.

13. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to a device operable to vary a characteristic of said process so as to maintain said process condition substantially constant, said apparatus comprising, in combination, a signal comparison circuit having first and second inputs and including converter means arranged to develop an alternating-current signal responsive to the difference between a pair of direct-current signals fed to said inputs respectively, means for feeding said direct-current deviation signal to said first input, an A.-C. amplifier coupled to the output of said comparison circuit to intensify the alternating-current signal produced thereby, amplitude detection means connected to the output of said amplifier to transform said intensified alternating-current signal to a corresponding direct-current output signal, a direct-current feedback circuit coupled between the output of said A.-C. amplifier and said second comparison circuit input, reactance means in said feedback circuit for producing at said second input a feedback signal which varies with respect to time if a constant direct-current signal is applied to said first input, whereby said direct-current output signal is caused to vary in response to the application of a constant deviation signal, manually-operable adjustment means for altering the effectiveness of said reactance means in varying said direct-current output signal, a D.-C. amplifier having an input circuit coupled to the output of said detection means and arranged to intensify said direct-current output signal, automatic-to-manual switch means adapted when placed in "manual" position to prevent said direct-current output signal from being fed to said D.-C. amplifier input circuit, a power source providing a direct-current signal of adjustable magnitude, means interconnecting said power source and said switch means and arranged when said switch means is in "manual" position to feed the direct-current signal from said power source to said D.-C. amplifier input circuit, and output circuit means for transmitting the intensified direct-current signal produced by said D.-C. amplifier to a process controlling device.

14. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding direct-current output signal for transmission to a device operable to vary a characteristic of said process so as to maintain said process condition substantially constant, said apparatus comprising, in combination, a signal comparison circuit having first and second inputs and including a cyclically-operable vibrator arranged to develop a square-wave alternating-current signal having a phase and amplitude responsive to the polarity and magnitude of the difference between a pair of direct-current signals fed to said inputs respectively, means for feeding said direct-current deviation signal to said first input, an A.-C. amplifier coupled to the output of said comparison circuit to intensify the square-wave alternating-current signal produced thereby, a resonant circuit in the output of said A.-C. amplifier, said circuit being tuned to resonance substantially at the frequency of operation of said vibrator so as to produce a sine-wave alternating-current signal corresponding in amplitude to the square-wave signal fed thereto, a phase-sensed amplitude detector connected to the output of said amplifier to transform the sine-wave signal to a corresponding direct-current output signal, a direct-current feedback circuit connected between the output of said phase-sensed detector and said second input of said comparison circuit, reactance means in said feedback circuit for producing at said second input a feedback signal which varies with respect to time upon the application of a constant direct-current signal to said first input, whereby said direct-current output signal is caused to vary in response to a constant deviation signal, manually-operable adjustment means for altering the effectiveness of said reactance means in varying said direct-current output signal, and output circuit means for transmitting said direct-current output signal to a process controlling device.

15. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to a device operable to vary a characteristic of said process so as to maintain said process condition substantially constant, said apparatus comprising, in combination, a signal comparison circuit having first and second inputs and including converter means arranged to develop an alternating-current signal responsive to the difference between a pair of direct-current signals fed to said inputs respectively, means for feeding said direct-current deviation signal to said first input, an A.-C. amplifier coupled to the output of said comparison circuit to intensify the alternating-current signal produced thereby, amplitude detection means connected to the output of said amplifier to transform said intensified alternating-current signal to a corresponding direct-current output signal, a feedback circuit connected between the output of said detection means and said second input of said comparison circuit, a reset reactance and a reset resistor in said feedback circuit for producing at said second input a feedback signal which varies with respect to time if a constant direct-current signal is applied to said first input, whereby said direct-current output signal is caused to vary in response to a constant deviation signal, manually-operable adjustment means for altering the resistance of said reset resistor, switch means under the control of said adjustment means and operable when said adjustment means has been set for minimum reset time to disable said reset reactance and said reset resistor, said switch means further being arranged when so operated to establish a non-reactive feedback path to said second comparison circuit input, and output circuit means for transmitting a control signal corresponding to said direct-current output signal to a process controlling device.

16. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to a device operable to vary a characteristic of said process so as to maintain said process condition substantially constant, said apparatus comprising, in combination, a signal comparison circuit having first and second inputs and means arranged to develop a signal responsive to the difference between a pair of direct-current signals fed to said inputs respectively, means for feeding said direct-current deviation signal to said first input, an amplifier coupled to the output of said comparison circuit to intensify the signal produced thereby, said amplifier including circuit means to produce a direct-current output signal in accordance with the output of said comparison circuit, a direct-current feedback circuit coupled between the output of said amplifier and said second input of said comparison circuit, reactance means in said feedback circuit for producing at said second input a feedback signal which varies with respect to time if a constant direct-current signal is applied to said first input, whereby said direct-current output signal is caused to vary in response to a constant deviation signal, output circuit means for transmitting a control signal corresponding to said direct-current output signal to a process controlling device, an automatic-balance-manual switch for switching between "automatic" and "manual" operation, a meter adapted to indicate the magnitude of direct-current signals fed thereto, a manual power supply adapted to furnish a direct-current signal of adjustable magnitude to said output circuit means when said switch is in "manual" position, and means connected to said switch when in "balance" position for coupling said meter differentially to both said manual power supply and the output of said amplifier so that the meter reads the difference between the manual signal and said direct-current output signal, whereby said manual power supply can be adjusted to produce an output equal to said direct-current output signal before said switch is placed in "manual" position.

17. For use in an industrial process control system wherein two or more electrical measurement signals are developed in accordance with respective conditions of the process, apparatus for altering a characteristic of the process in response to changes in one or the other of said conditions comprising first and second control function generators each having an input circuit adapted to receive a corresponding one of said measurement signals, first and second adjustable set point supply means coupled to said input circuits respectively, said input circuits including signal comparison means adapted to produce respective deviation signals responsive to the difference between the corresponding measurement and set point signals, amplifying means for each of said function generators including an output circuit arranged to produce a direct-current output control signal in accordance with the deviation signal fed from the corresponding signal comparison means, control-signal responsive means arranged to vary said process characteristic in accordance with changes in an electrical signal fed thereto, first and second signal transmission circuits for coupling the output circuits of said amplifying means in parallel and to said control-signal responsive means, and first and second rectifying means in series with said signal transmission circuits respectively, said rectifying means serving to block off from said control-signal responsive means the one of said output control signals having the smaller amplitude.

18. Apparatus as claimed in claim 17, wherein at least one of said control function generators includes reset reactance means, and circuit means for maintaining said reactance means activated to a level corresponding to the signal fed to said control-signal responsive means when the output of said one function generator is blocked off.

19. Apparatus as claimed in claim 18, wherein the amplifying means for said one control function generator includes a D.-C. feedback circuit, a reset capacitor and a reset resistor connected in said feedback circuit for altering said direct-current output signal as a function of time, said circuit means coupling said capacitor to said signal transmission circuit to maintain said capacitor charged to the level of the signal fed to said control-signal responsive means when the output of said one function generator is blocked off.

20. Apparatus as claimed in claim 17, wherein said amplifying means consists of an A.-C. amplifier having a phase-sensed amplitude detector in the output circuit thereof.

21. Apparatus as claimed in claim 17, wherein the output impedance of said amplifying means is not substantially greater than the impedance of the signal transmission circuit feeding the control signal from said rectifying means to said control-signal responsive means.

22. Apparatus as claimed in claim 21, including an impedance-matching device coupled between said rectifying means and the input to said signal transmission circuit, said impedance-matching device being arranged to present an impedance to said rectifying means that is substantially greater than the output impedance of said amplifying means.

23. Apparatus as claimed in claim 22, wherein said amplifying means is provided with a positive feedback circuit to intensify the gain thereof.

24. Industrial process control apparatus operable by a direct-current measurement signal, comprising, in combination, an adjustable set signal power supply arranged to produce a direct-current set signal of selected magnitude, circuit means for connecting the output of said power supply in series-opposition to said measurement signal so as to produce a direct-current deviation signal representing the extent to which the measured process condition deviates from the preselected set value, control signal generating apparatus including a comparison circuit having first and second inputs, said comparison circuit comprising means arranged to develop a signal responsive to the difference between a pair of direct-current signals fed to said inputs respectively, means for feeding said direct-current deviation signal to said first comparison circuit input, an amplifier coupled to the output of said comparison circuit to intensify the signal produced thereby and to develop a corresponding direct-current output signal, a direct-current feedback circuit connected between the output of said amplifier and said second input of said comparison circuit, a meter forming part of said apparatus and coupled to the input of said comparison circuit to provide a continuous indication of the magnitude of said deviation signal, and transmission circuit means for feeding a control signal corresponding to said direct-current output signal to operating means associated with the process for controlling a characteristic of the process so as to maintain said measured condition substantially constant.

25. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to a device operable to vary a characteristic of said process so as to maintain said process condition substantially constant, said apparatus comprising, in combination, a signal comparison circuit having first and second inputs and including converter means arranged to develop an alternating-current signal responsive to the difference between a pair of direct-current signals fed to said inputs respectively, means for feeding said direct-current deviation signal to said first input, a multi-stage A.-C. amplifier coupled to the output of said comparison circuit to intensify the alternating-current signal produced thereby, negative feedback means for said amplifier to increase the effective input impedance thereof, amplitude detection means connected to the output of said amplifier to transform said intensified alternating-current signal to a corresponding direct-current output signal, a direct-current feedback circuit connected between the output of said detection means and said second input of said comparison circuit, reactance means in said feedback circuit for producing at said second input a feedback signal which varies with respect to time if a constant direct-current signal is applied to said first input, whereby said direct-current output signal is caused to vary in response to a constant deviation signal, and output circuit means for transmitting a control signal corresponding to said direct-current output signal to a process controlling device.

26. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to a device operable to vary a characteristic of said process so as to maintain said process condition substantially constant, said apparatus comprising, in combination, a signal comparison circuit having first and second inputs and including converter means arranged to develop an alternating-current signal responsive to the polarity and magnitude of the difference between a pair of direct-current signals fed to said inputs respectively, means for feeding said direct-current deviation signal to said first input, a multi-stage A.-C. amplifier coupled to the output of said comparison circuit to intensify said alternating-current signal, a limiter circuit coupled between two of the stages of said amplifier to limit the magnitude of the A.-C. signal produced thereby, amplitude detection means connected to the output of said amplifier to transform said intensified alternating-current signal to a corresponding direct-current output signal, a direct-current feedback circuit connected between the output of said detection means and said second input of said comparison circuit, reactance means in said feedback circuit for producing at said second input a feedback signal which varies with respect to time if a constant direct-current signal is applied to said first input, whereby said direct-current output signal is caused to vary in response to a constant deviation signal, and output circuit means for transmitting a control signal corresponding to said direct-current output signal to a process controlling device.

27. Apparatus as claimed in claim 26, wherein said limiter circuit comprises a pair of reverse-connected rectifiers.

28. Apparatus as claimed in claim 27, wherein said limiter circuit is provided with D.-C. biasing means to set the maximum amplitude of said A.-C. signal at a predetermined level.

29. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding direct-current output signal for transmission to a device operable to vary a characteristic of said process so as to maintain said process condition substantially constant, said apparatus comprising, in combination, a signal comparison circuit having first and second inputs and including converter means arranged to develop an alternating-current signal having a phase and amplitude responsive to the polarity and magnitude of the difference between a pair of direct-current signals fed to said inputs respectively, means for feeding said direct-current deviation signal to said first input, a multi-stage A.-C. amplifier coupled to the output of said comparison circuit to intensify said alternating-current signal, a first limiter circuit coupled between a first pair of stages of said amplifier to limit the magnitude of the A.-C. signal produced thereby, a second limiter circuit coupled between a second pair of stages of said amplifier to limit the magnitude of the A.-C. signal produced thereby, a phase-sensed amplitude detector connected to the output of said amplifier to transform said intensified alternating-current signal to a corresponding direct-current output signal, a direct-current feedback circuit connected between the output of said phase-sensed detector and said second input of said comparison circuit, reactance means in said feedback circuit for producing at said second input a feedback signal which varies with respect to time upon the application of a constant direct-current signal to said first input, whereby said direct-current output signal is caused to vary in response to a constant deviation signal, and output circuit means for transmitting said direct-current output signal to a process controlling device.

30. In an industrial process control system wherein a direct-current deviation signal is produced in accordance with the difference between a measurement signal developed by a condition-responsive device at the process and a set signal fixed at a predetermined level, control signal generating apparatus adapted to receive said direct-current deviation signal and to produce a corresponding control signal for transmission to a device operable to vary a characteristic of said process so as to maintain said process condition substantially constant, said apparatus comprising, in combination, a signal comparison circuit having first and second inputs and including converter means arranged to develop an alternating-current signal responsive to the difference between a pair of direct-current signals fed to said inputs respectively, means for feeding said direct-current deviation signal to said first input, an A.-C. amplifier coupled to the output of said comparison circuit to intensify the alternating-current signal produced thereby, amplitude detection means connected to the output of said amplifier to transform said intensified alternating-current signal to a corresponding direct-current output signal, feedback circuit connected between the output of said detection means and said second input of said comparison circuit, a rate signal generating means comprising a reactance in said feedback circuit for producing at said second input a feedback signal which increases with respect to time if a constant direct-current signal is applied to said first input, whereby said direct-current output signal is caused to vary correspondingly, circuit means coupled to said reactance and arranged to produce a small initial feedback signal at said second input simultaneously with any change in the direct-current signal applied to said first input so as momentarily to lessen the change as said direct-current output signal, and output circuit means for transmitting a control signal corresponding to said direct-current output signal to a process controlling device.

31. Apparatus as claimed in claim 30, wherein said reactance consists of a shunt capacitive element, said circuit means comprising a resistor connected in series with said capacitive element.

No references cited.